United States Patent
Hirokawa et al.

(10) Patent No.: US 9,392,065 B2
(45) Date of Patent: Jul. 12, 2016

(54) INFORMATION PROCESSING SYSTEM AND INFORMATION PROCESSING METHOD

(75) Inventors: Yohei Hirokawa, Tokyo (JP); Kazuhiro Okanoue, Tokyo (JP)

(73) Assignee: NEC Corporation, Tokyo (JP)

( * ) Notice: Subject to any disclaimer, the term of this patent is extended or adjusted under 35 U.S.C. 154(b) by 218 days.

(21) Appl. No.: 13/703,884

(22) PCT Filed: May 25, 2011

(86) PCT No.: PCT/JP2011/002902
§ 371 (c)(1),
(2), (4) Date: Dec. 12, 2012

(87) PCT Pub. No.: WO2011/158442
PCT Pub. Date: Dec. 22, 2011

(65) Prior Publication Data
US 2013/0091290 A1    Apr. 11, 2013

(30) Foreign Application Priority Data
Jun. 15, 2010    (JP) ................... 2010-135928

(51) Int. Cl.
*G06F 15/16* (2006.01)
*H04L 29/08* (2006.01)
*H04N 7/15* (2006.01)
*H04N 21/222* (2011.01)
(Continued)

(52) U.S. Cl.
CPC ............ *H04L 67/141* (2013.01); *H04L 67/303* (2013.01); *H04N 7/15* (2013.01); *H04N 21/2221* (2013.01); *H04N 21/234363* (2013.01); *H04N 21/234372* (2013.01); *H04N 21/25825* (2013.01); *H04N 21/25841* (2013.01); *H04N 21/4143* (2013.01); *H04N 21/41407* (2013.01)

(58) Field of Classification Search
CPC ................................ H04L 29/08; H04N 21/40
USPC .......................................................... 709/227
See application file for complete search history.

(56) References Cited

U.S. PATENT DOCUMENTS 6,453,336 B1 * 9/2002 Beyda ..................... H04L 29/06
                                                     709/204
7,639,816 B2    12/2009 Nakagomi et al.
(Continued)

FOREIGN PATENT DOCUMENTS

JP    2001-177665 A    6/2001
JP    2002-217985 A    8/2002
(Continued)

OTHER PUBLICATIONS

International Search Report in PCT/JP2011/002902 dated Aug. 16, 2011(English Translation Thereof).

*Primary Examiner* — Tauqir Hussain
(74) *Attorney, Agent, or Firm* — McGinn IP Law Group, PLLC (57) ABSTRACT

An information processing system (100) includes a unit (101) of separating at least one piece of media information from a plurality of pieces of media information acquired through a session established with at least one server based on profiles of a plurality of terminal devices, a unit (103) of structuring each of contents to be respectively transmitted to the plurality of terminal devices from the at least one piece of media information separated by the unit (101), and a unit (105) of transmitting each content structured by the unit (103) to each terminal device.

18 Claims, 7 Drawing Sheets

(51) Int. Cl.
*H04N 21/2343* (2011.01)
*H04N 21/258* (2011.01)
*H04N 21/414* (2011.01)
*H04N 21/4143* (2011.01)

(56) References Cited

U.S. PATENT DOCUMENTS

| | | | |
|---|---|---|---|
| 2003/0128714 A1 | 7/2003 | Mio et al. | |
| 2005/0207551 A1 | 9/2005 | Nagashima | |
| 2006/0234744 A1* | 10/2006 | Sung et al. | 455/518 |
| 2007/0192465 A1* | 8/2007 | Modarressi | 709/223 |
| 2007/0232223 A1* | 10/2007 | Bilange | 455/3.06 |
| 2008/0086564 A1* | 4/2008 | Putman et al. | 709/227 |
| 2010/0118844 A1* | 5/2010 | Jiao et al. | 370/338 |
| 2010/0174735 A1* | 7/2010 | Fiatal | 707/769 |
| 2011/0065376 A1* | 3/2011 | Forutanpour et al. | 455/3.01 |
| 2013/0024901 A1* | 1/2013 | Sharif-Ahmadi | G06F 17/30017 725/114 |
| 2013/0198331 A1* | 8/2013 | Ho et al. | 709/217 |

FOREIGN PATENT DOCUMENTS

| | | |
|---|---|---|
| JP | 2002-281558 A | 9/2002 |
| JP | 2003-283673 A | 10/2003 |
| JP | 2005-268954 A | 9/2005 |
| JP | 2008-532456 A | 8/2008 |
| JP | 2009-237687 A | 10/2009 |

* cited by examiner

| USER ID | | TERMINAL DEVICE 1 | TERMINAL DEVICE 2 | TERMINAL DEVICE 3 | ... |
|---|---|---|---|---|---|
| 1234567 | TERMINAL ID | 0001 | 0002 | 0003 | ... |
| | IP ADDRESS | 192.168.25.03 | 192.168.128.133 | 192.168.36.163 | ... |
| | POSITION INFORMATION | HOME | MOBILE | MEETING ROOM | ... |
| | SPEC | SCREEN: FULL HD 1920×1080 FULL COLOR 32 INCH SOUND: STEREO COMMUNICATION: DOWNLINK MAXIMUM 500 Mbps POWER SOURCE: EXTERNAL | SCREEN: VGA 854×480 FULL COLOR 3.2 INCH SOUND: STEREO COMMUNICATION: DOWNLINK MAXIMUM 3.6 Mbps POWER SOURCE: BATTERY | SCREEN: FULL HD 1920×1080 FULL COLOR 50 inch SOUND: STEREO COMMUNICATION: DOWNLINK MAXIMUM 1 Gbps POWER SOURCE: EXTERNAL | |
| | SECURITY LEVEL | LOW | MEDIUM | HIGH | ... |
| | STATUS | OUTPUTTING | OUTPUTTING | ON STANDBY | ... |

INFORMATION PROCESSING SYSTEM AND INFORMATION PROCESSING METHOD

TECHNICAL FIELD

The present invention relates to a technique of controlling information acquired in a session established with a server.

BACKGROUND ART

There have been known techniques of performing a session connection with a plurality of terminal devices. For example, a technique of causing the same screen to be displayed on a mobile phone and a television is discussed in Patent Document 1. In Patent Document 1, an authentication server transmits a session identifier to an information appliance according to a request, and the information appliance converts the session identifier and a device identifier into a two-dimensional code and displays the two-dimensional code on a screen. A mobile phone images the two-dimensional code, accesses the authentication server, and transmits screen data delivered to the portable electronic device to a specified information appliance based on a screen sharing table when user authentication is completed.

RELATED DOCUMENT

Patent Document

Patent Document 1: Japanese Laid-open patent publication No. 2009-237687

SUMMARY OF THE INVENTION

However, in the technique discussed in Patent Document 1, structuring of content from media information in a session according to an environment of each terminal device is not performed. For this reason, there is a limitation to a terminal device that can perform a session connection, and a degree of freedom to adapt to a user environment is not sufficient.

The present invention is direction to provide a technique capable of solving the above problems.

In aspects of the present invention, the following configurations are employed in order to solve the above-mentioned problems. An information processing system according to a first aspect of the present invention includes a session control unit that separates at least one piece of media information from a plurality of pieces of media information acquired through a session established with at least one server based on profiles of a plurality of terminal devices, a content structuring unit that structures each of contents to be respectively transmitted to the plurality of terminal devices from the at least one piece of media information separated by the session control unit, and a transmitting unit that transmits each content structured by the content structuring unit to each terminal device.

An information processing method according to a second aspect of the present invention includes acquiring a plurality of pieces of media information through a session established with at least one server, separating at least one piece of media information from the acquired plurality of pieces of media information based on profiles of a plurality of terminal devices, structuring each of contents to be respectively transmitted to the plurality of terminal devices from the at least one piece of separated media information, and transmitting each structured content to each terminal device.

A recording medium according to a third aspect of the present invention is a recording medium readable by at least one computer and records a program causing at least one computer to execute: acquiring a plurality of pieces of media information through a session established with at least one server; separating at least one piece of media information from the acquired plurality of pieces of media information based on profiles of a plurality of terminal devices; structuring each of contents to be respectively transmitted to the plurality of terminal devices from the at least one piece of separated media information; and transmitting each structured content to each terminal device. As another aspect of the present invention, there may be provided a program stored in the recording medium according to the third aspect.

According to the exemplary embodiments of the present invention, it is possible to provide users of diverse environments with content with a high degree of freedom.

DESCRIPTION OF EMBODIMENTS

Hereinafter, exemplary embodiments of the present invention will be described in detail with reference to the accompanying drawings. Here, components described in the following exemplary embodiments are merely exemplary and not intended to limit a technical scope of the present invention. In the following description, "media information" is the expression to separate part of complex information transmitted in one session, and has a concept including electronic media and digital media. For example, when audio information is separated from video information, a video and a sound are defined as different media information. The media information includes still image data, document data, and sensory data (vibration or the like) as well as a video and a sound.

In addition, in the following description, a "session" is a connection unit when seen from a user side, and refers to a series of communication established between a terminal device and a server until the user logs out after the user logs in using the terminal device.

(First Exemplary Embodiment)

Figure 1:
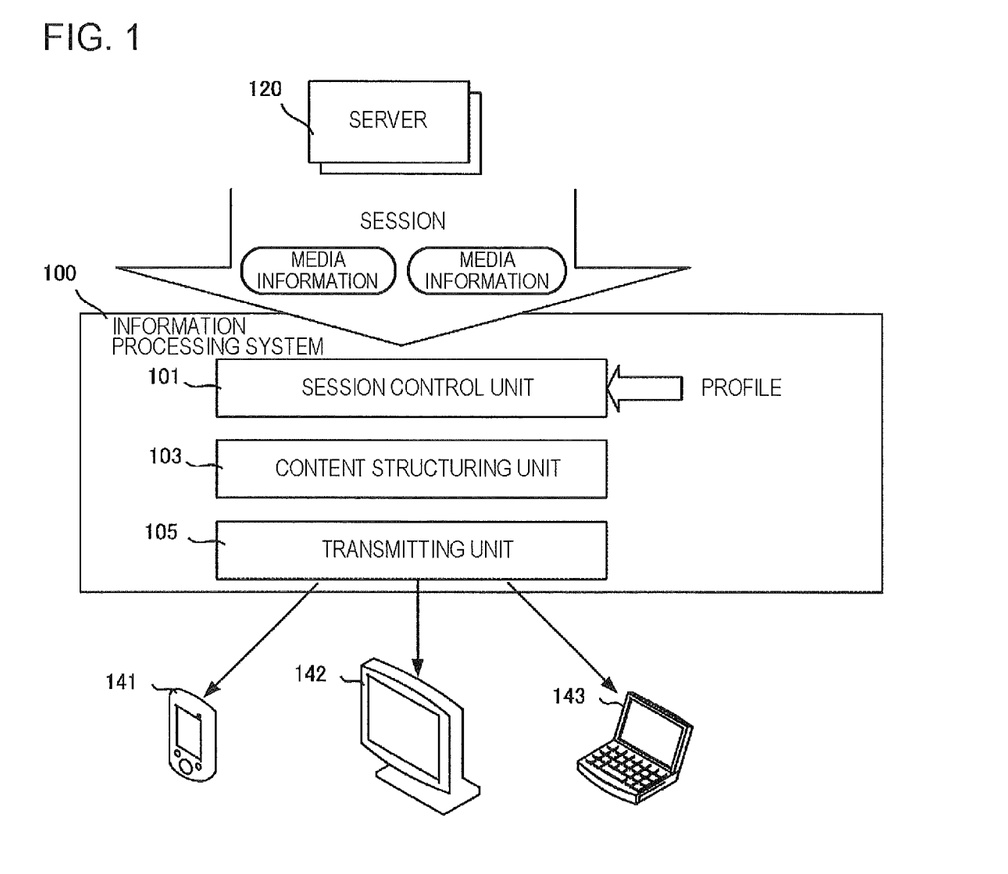
FIG. 1 is a diagram illustrating an outline of an information processing system according to a first exemplary embodiment of the present invention.

An information processing system 100 according to a first exemplary embodiment of the present invention will be described with reference to FIG. 1. The information processing system 100 is an information processing system that acquires two or more pieces of media information from at least one server 120, and transmits the acquired media information to two or more terminal devices 141, 142, and 143.

The information processing system 100 includes a session control unit 101, a content structuring unit 103, and a transmitting unit 105. The session control unit 101 separates at least one piece of media information from the received two or more pieces of media information based on respective profiles of the terminal devices 141, 142, and 143 in a session established with the server 120. The content structuring unit 103 structures contents to be respectively transmitted to the terminal devices 141, 142, and 143 from at least one piece of media information separated by the session control unit 101. The transmitting unit 105 transmits the contents structured by the content structuring unit 103 to the terminal devices 141, 142, and 143.

According to the present exemplary embodiment, information tailored to a terminal device to output can be separated from the two or more pieces of media information received in a session established with the server, and it is possible to provide users of diverse environments with content with a high degree of freedom.

(Second Exemplary Embodiment)

An information processing system according to a second exemplary embodiment of the present invention will be described with reference to FIG. 2.

The information processing system according to the second exemplary embodiment can satisfy a desire of the user who wants to join a web meeting by a mobile terminal such as a mobile phone, a smart phone, or a mobile PC. Particularly, since the mobile terminal can be carried by the user, the mobile terminal has features that the position of the terminal changes and a peripheral device changes. In addition, communication executed by the mobile terminal is not enough in communication resources and slow in the speed, compared to wired communication. Thus, when communication of rich media such as a web meeting is performed through the mobile terminal, it is difficult to apply a communication function generally implemented in a personal computer (PC) to the mobile terminal as is.

For this reason, media filtering according to a profile (a specification or the like) of the mobile terminal needs to be performed between the web meeting application server 210 and the mobile terminal of the user. Meanwhile, since it is possible to support the communication of rich media using another terminal device present in a place to which the mobile terminal has moved, a function which is hardly implemented only by the mobile terminal can be implemented. According to this configuration, it is possible to cause the mobile terminal to function as a remote controller with an ID, and information from the web meeting application server can be output to various terminal devices based on authentication in the mobile terminal.

[System Configuration]

Figure 2:
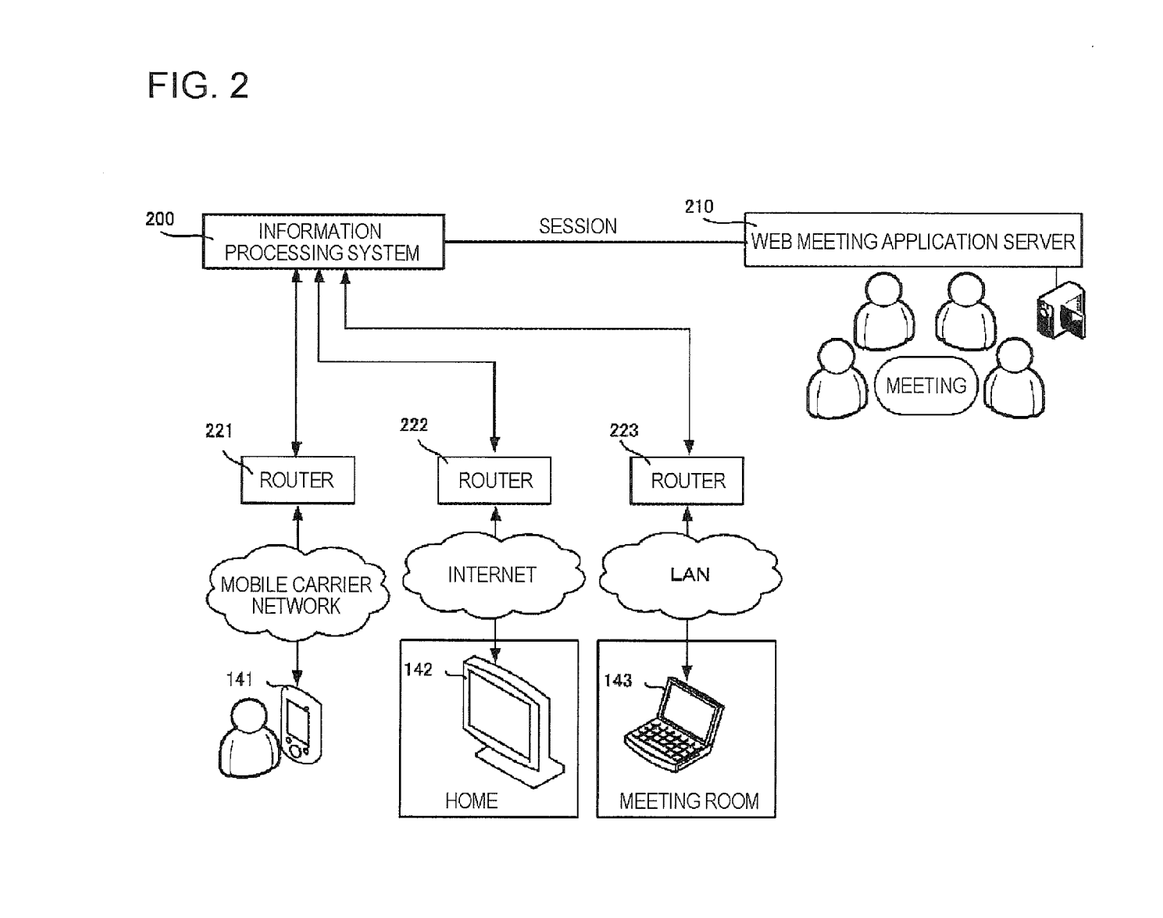
FIG. 2 is a diagram illustrating a use status of an information processing system according to a second exemplary embodiment of the present invention.

Referring to FIG. 2, the information processing system 200 is connected to the web meeting application server 210 directly or through a network, and configured to be able to establish a session related to the web meeting application server 210. Meanwhile, the information processing system 200 is also connected to the terminal devices 141, 142, and 143 through routers 221, 222, and 223. Here, since a mobile phone is assumed as terminal device 141, the router 221 performs communication control such that information received from the information processing system 200 is delivered to the terminal device 141 through a mobile carrier network. In addition, a display connected with the Internet at home is assumed as the terminal device 142, the router 222 performs communication control such that information received from the information processing system 200 is delivered to the terminal device 142 through the Internet. Furthermore, since a computer or the like connected to a local area network (LAN) at a meeting room is assumed as the terminal device 143, the router 223 controls communication control such that information received from the information processing system 200 is delivered to the terminal device 143 through the LAN.

Meanwhile, the information processing system 200 establishes a session with the web meeting application server 210 using an user identification (ID) or a password acquired from any one of the terminal devices 141, 142, and 143. In other words, the information processing system 200 functions as a relay device that controls information of a session between the web meeting application server 210 and the terminal devices 141, 142, and 143.

A detailed internal configuration of the information processing system 200 will be described with reference to FIG. 3. The information processing system 200 includes a managing unit 107 in addition to the configuration of the information processing system 100 according to the first exemplary embodiment. The managing unit 107 includes a profile database 300 and manages profile information of at least one terminal device corresponding to each user on a plurality of users who share contents. The content structuring unit 103 structures a content corresponding to a profile of each terminal device, which is managed by the managing unit 107.

In the present exemplary embodiment, the web meeting application server 210 includes a video server 211, a material server 212, and a meeting managing server 213. The meeting managing server 213 is a server that manages information on a meeting participant and so on. The session control unit 101 has a function of separating and multiplexing media information dealt in a session with each server. Particularly, the session control unit 101 selects, separates, or multiplexes necessary information from media information included in a session according to a terminal device based on the profile database 300 managed in the managing unit 107. For example, the session control unit 101 can generate an audio session by separating an audio part from video data received in a session established with the video server 211 using an audio separation software (not illustrated) or generate a frame-advance image session by taking a frame from the video data.

The content structuring unit 103 generates data which is to be finally output to the terminal devices 141, 142, and 143 based on the profile database 300. For example, the content structuring unit 103 enlarges image data according to the size or the resolution of a screen of a terminal device of an output destination, converts a stereophonic sound into a monophonic sound according to an audio output specification of a terminal device of an output destination, or compresses various kinds of data according to a communication environment with a terminal device of an output destination.

Figure 3:
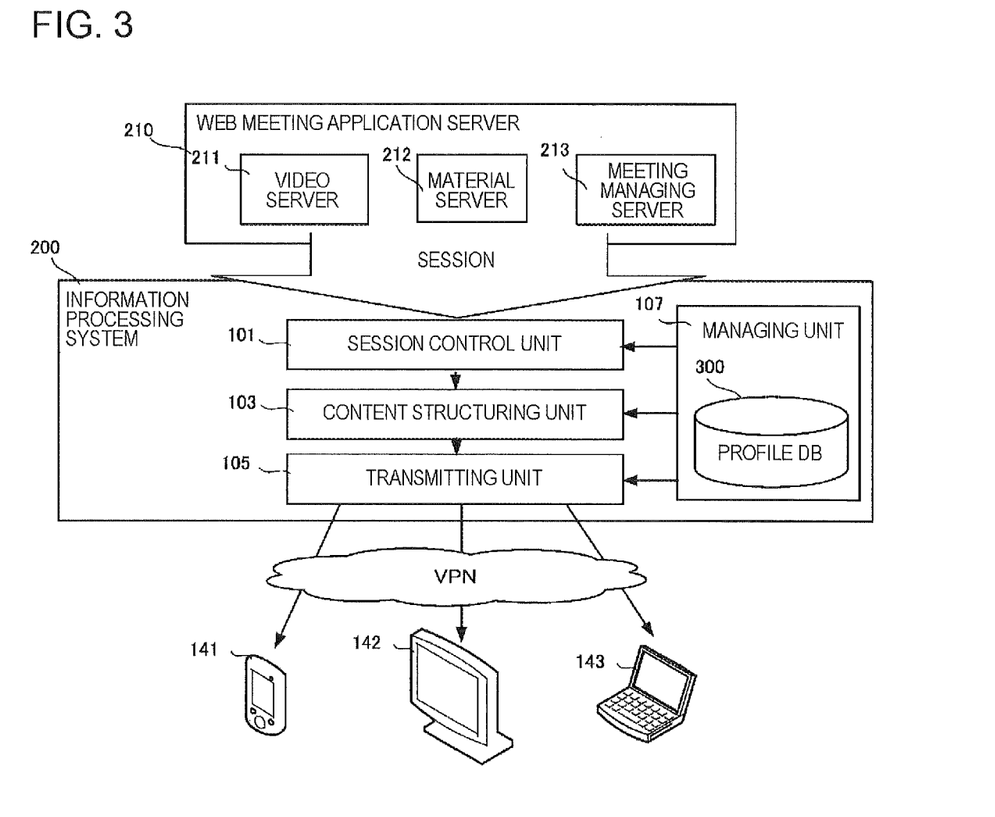
FIG. 3 is a diagram illustrating an outline of the information processing system according to the second exemplary embodiment of the present invention.

In addition, the transmitting unit 105 can make a virtual private network (VPN) connection with each terminal using a remote desktop protocol (RDP) technique as illustrated in FIG. 3. Meanwhile, for example, when the terminal device 141 is a mobile phone and only a sound output from the terminal device 141 is performed, the content structuring unit 103 may perform codec conversion, and the transmitting unit 105 may output only a sound through a public line. For example, in the information processing system 200, a sound can be output from the mobile phone serving as the terminal device 141, and a video can be output on a screen of a television serving as the terminal device 142. In this case, the managing unit 107 may detect a position relation between the terminal device 141 and the terminal device 142, determine whether or not the terminal device 141 and the terminal device 142 are present at almost the same position, and output information to the terminal device 141 and the terminal device 142.

[Profile Database]

Figure 4:
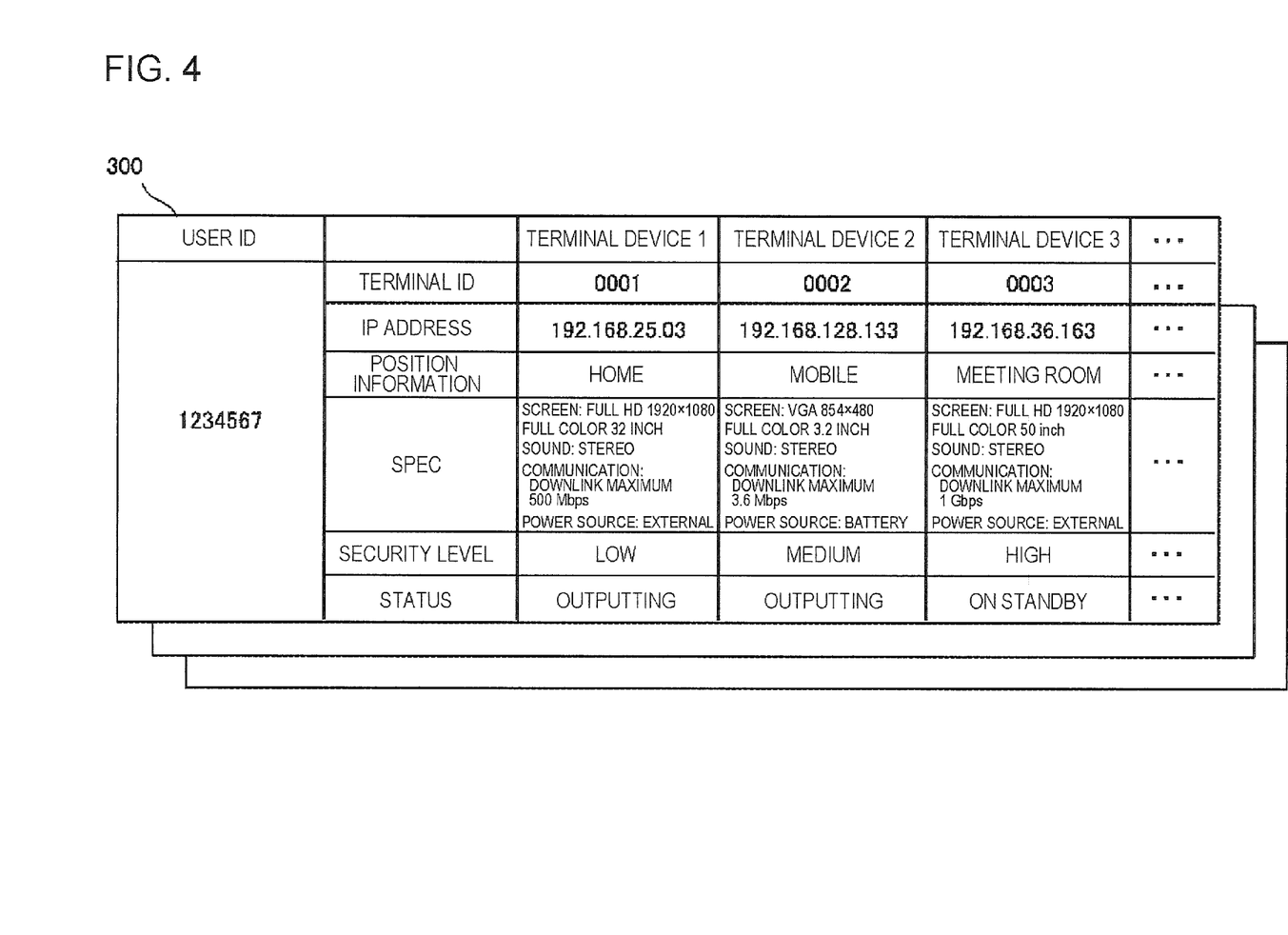
FIG. 4 is a diagram illustrating an example of a profile database according to the second exemplary embodiment of the present invention.

FIG. 4 is a diagram illustrating an example of content of the profile database 300. In the profile database 300, a plurality of terminal devices are registered for each user ID, and a terminal ID, an IP address (a global IP address or an IP address for a VPN), position information, a specification, a security level, and the like are registered for each terminal device. In the present exemplary embodiment, a screen size, an output color, an output sound, a communication rate, a power state (whether an external power source is a battery), and the like are registered as specifications of a terminal device.

The information may be registered one by one on each terminal by the user, or may be set in a way that the user selects a terminal to use from a terminal database in which the position and the specification are registered on a plurality of terminals in advance. The session control unit 101 separates and extracts media information appropriate to an output terminal from a plurality of pieces of media information transmitted in a session with reference to the profile information of each terminal device which is registered as described above. Furthermore, the content structuring unit 103 structures a content with reference to the profile information of each terminal device. For example, when media information with a high security level is acquired from the server, the content structuring unit 103 may perform filtering such that the corresponding media information is not output to a terminal device with a low security level. Alternatively, in order to output information with a high security level to a terminal with a with a low security level, the content structuring unit 103 may apply image processing (a mosaic) to a part of a content.

Further, information representing status of terminal devices 1 to 3 is registered in the profile database 300. In the example of FIG. 4, the terminal device 1 and the terminal device 2 are outputting session data, and the terminal device 3 is on standby. Furthermore, the information processing system 200 may sequentially extract information representing whether or not a terminal device is powered on from the terminal device and registers the extracted information in the profile database 300.

[Flow of Process]

Figure 5:
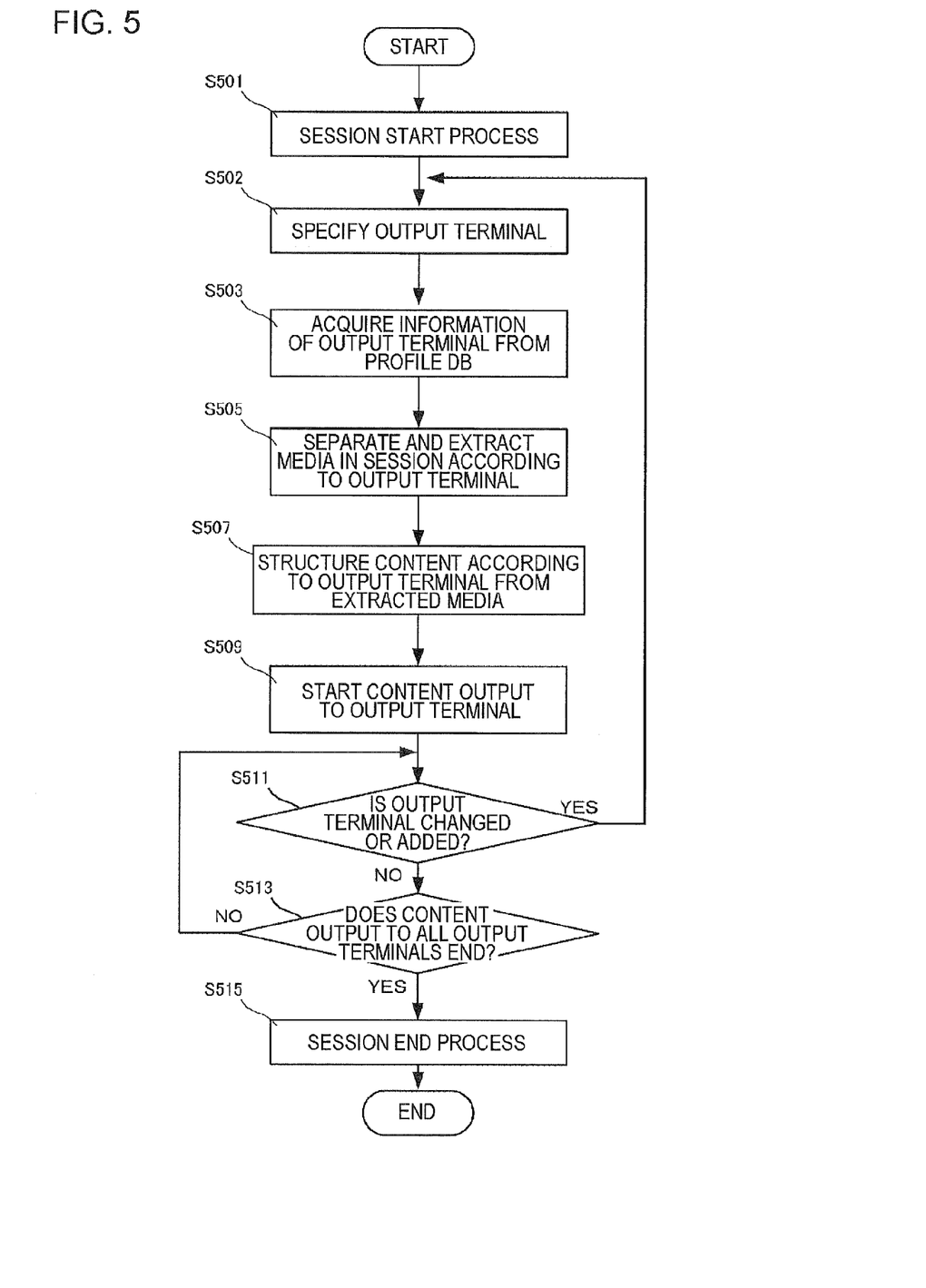
FIG. 5 is a flowchart illustrating the flow of a process of the information processing system according to the second exemplary embodiment of the present invention.

FIG. 5 is a flowchart illustrating the flow of a process according to the present exemplary embodiment. Referring to FIG. 5, first, in step S501, the session control unit 101 starts a session. More specifically, the information processing system 200 performs authentication using an ID and a password input by the user, and then starts a session when the user logs in the web meeting application server 210. Next, in step S502, the information processing system 200 specifies a terminal device (an output terminal) to which data is output during a session. In the case where the session is started by access using a mobile terminal, the information processing system 200 specifies the mobile terminal as a default output terminal. In the case where the session is started by logging in using a PC, the information processing system 200 specifies the PC as a default output terminal. The information processing system 200 may cause a list of information related to other registered terminal devices to be displayed on a screen of a terminal device used to log in based on the profile database 300 so that the user can select an output terminal from the list.

Alternatively, a terminal device of an output target be specified in a way that an ID is read from a tag of an RFID or the like labeled on the terminal device in advance by the user's read operation, and the information processing system 200 collates the received ID with the profile database 300.

Next, in step S503, the session control unit 101 acquires a profile of the specified output terminal with reference to the profile database 300. Then, in step S505, the session control unit 101 separates and extracts media information in a session according to the profile of the output terminal.

In addition, in step S507, the content structuring unit 103 structures a content according to the profile of the output terminal from the media information extracted according to the profile of the output terminal. Then, in step S509, the transmitting unit 105 outputs the structured content to the output terminal using the profile (the IP address or the like) of the output terminal.

After content output start, in step S511, the information processing system 200 monitors an instruction to change or add an output terminal. Here, when an instruction to change or add an output terminal is given from the user, the information processing system 200 causes the process to return to step S502, and then specifies an output terminal again. For example, a method of causing the user to specify a plurality of output terminals from a list displayed on the display of the mobile terminal may be used as a method of performing an instruction to change or add an output terminal. Alternatively, the information processing system 200 may change or add an output terminal by activating an RFID reader built in the mobile terminal while the mobile terminal is outputting a sound and by causing the RFID reader to read an RFID originally attached to the display at home, in the meeting room, or the like. Here, when the output terminal is added, a content to be output to an original output terminal may be structured again. For example, when a large screen display is added as an output terminal in a state in which a moving picture, document data, or the like is displayed on a mobile PC, the information processing system 200 may cause the material data to be displayed on the mobile PC and cause the moving picture showing a meeting scene to be output on the large screen display. In reverse, the information processing system 200 releases some output terminals when the user moves to another place from a place in which data is originally displayed on the large screen display.

The managing unit 107 may be actively involved change or addition of the output terminal. In other words, for example, the managing unit 107 may trace the position of the mobile terminal serving as the output terminal, and recommend a terminal device present in a place closest to the mobile terminal as an output terminal. On the contrary, the managing unit 107 may be configured to cause a terminal device present in a place far from the mobile terminal not to be selected as an output terminal. For example, there may be used a method of performing a display on the screen of the mobile terminal such that a terminal present in a place far from the mobile terminal is not selected as the output terminal.

The process proceeds to step S513 when the process of changing or adding the output terminal is not performed. In step S513, the information processing system 200 determines whether or not an instruction to complete a content output to all output terminals registered by the user has been given or whether or not it is a state in which it is necessary to complete a content output to all output terminals (for example, when all output terminals are powered off).

Here, when a content output is not completed, the information processing system 200 causes the process to return to step S511, and repeatedly checks whether or not an output terminal is changed or added. However, when a content output is completed, the information processing system 200 causes the process to proceed to step S515, and performs a process of terminating a session with the web meeting application server 210.

According to the present exemplary embodiment, various kinds of sessions in which information is received from various kinds of servers are combined, and thus it is possible to provide users of diverse environments with content with a high degree of freedom.

(Third Exemplary Embodiment)

Figure 6:
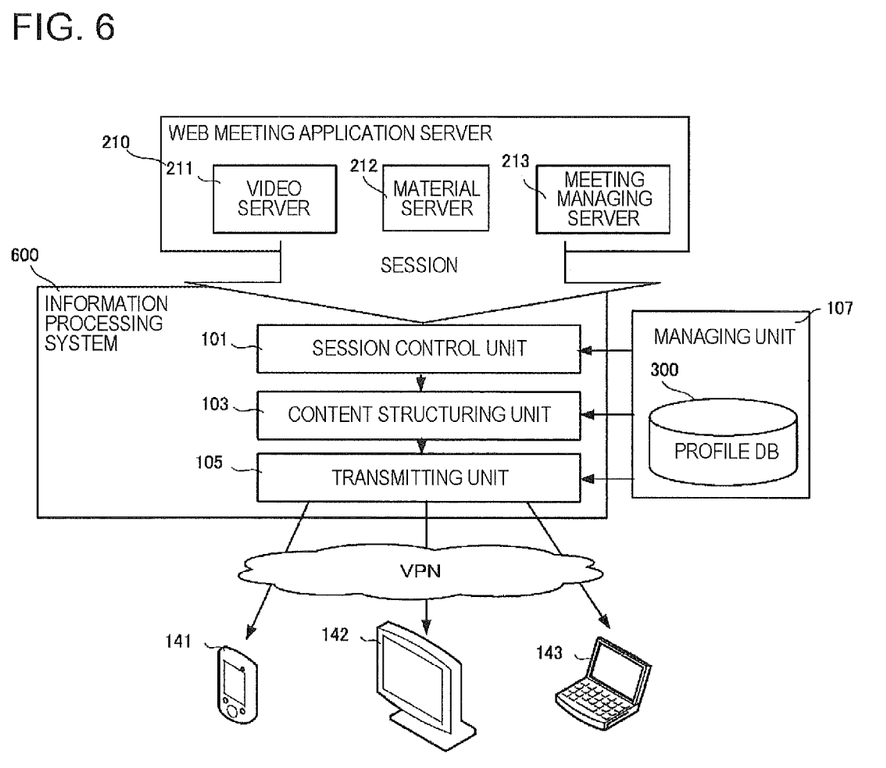
FIG. 6 is a diagram illustrating an outline of an information processing system according to a third exemplary embodiment of the present invention.

An information processing system 600 according to a third exemplary embodiment of the present invention will be described with reference to FIG. 6. According to the second exemplary embodiment, the information processing system 200 includes the managing unit 107 and the profile database 300 as its internal configuration. However, according to the third exemplary embodiment, the information processing system 600 itself does not include the managing unit 107 and the profile database 300 as its internal configuration. In the third exemplary embodiment, the managing unit 107 and the profile database 300 are managed outside the information processing system 600.

Here, when the managing unit 107 and the profile database 300 are provided outside the information processing system 600 as described above, there is an effect by which it is possible to easily deal with an increase in the profile database 300 or the like.

(Fourth Exemplary Embodiment)

Figure 7:
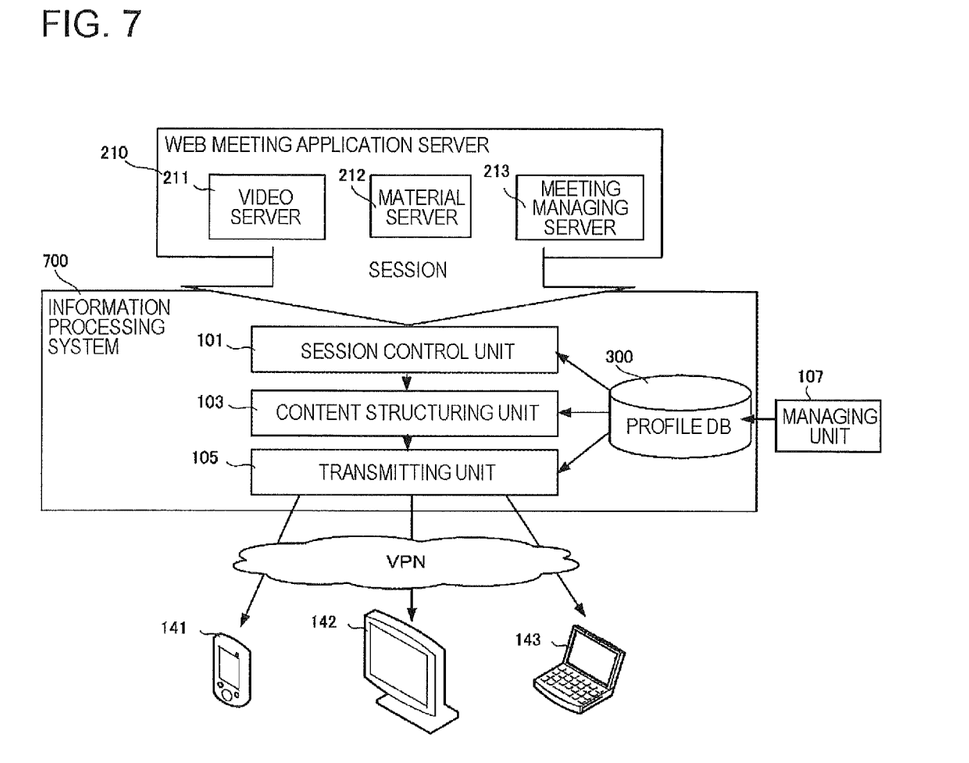
FIG. 7 is a diagram illustrating an outline of an information processing system according to a fourth exemplary embodiment of the present invention.

An information processing system 700 according to a fourth exemplary embodiment of the present invention will be described with reference to FIG. 7. In the second exemplary embodiment, the information processing system 200 includes the managing unit 107 and the profile database 300 as its internal configuration. However, in the fourth exemplary embodiment, the information processing system 700 includes the profile database 300 but does not include the managing unit 107. In other words, in the fourth exemplary embodiment, the profile database 300 is provided as the internal configuration of the information processing system 700 but managed by the managing unit 107 outside the information processing system 700.

In this case, the managing unit 107 can be arranged at the position close to the terminal devices 141, 142, and 143, and thus a system in which information representing status or features of the terminal devices 141, 142, and 143 can be easily collected can be configured.

(Other Exemplary Embodiments)

The exemplary embodiments of the present invention have been described above, a system or an apparatus in which the separate features included in the respective exemplary embodiments are combined is also included in the scope of the present invention.

Further, the present invention may be applied to a system configured with a plurality of devices or may be applied to a single device. In addition, the present invention can be applied even to the case in which an information processing program of implementing the functions according the exemplary embodiment is supplied from to a device directly or remotely. Thus, a program installed in a computer to implement the function of the present invention by a computer, a recording medium (including a continuous recording medium) which can be read by the computer in which the program is stored, and a WWW server that allows downloading of the program are also included in the scope of the present invention.

[Other Examples of Exemplary Embodiments]

Some or all above-described exemplary embodiments are set forth in the following additional notes, but the present invention is not limited to the following supplementary notes.

(Supplementary Note 1) An information processing system, including: a session control unit that separates at least one piece of media information from a plurality of pieces of media information acquired through a session established with at least one server based on profiles of a plurality of terminal devices; a content structuring unit that structures each of contents to be respectively transmitted to the plurality of terminal devices from the at least one piece of media information separated by the session control unit; and a transmitting unit that transmits each content structured by the content structuring unit to each terminal device.

(Supplementary Note 2) The information processing system according to Supplementary Note 1, wherein the session control unit separates audio information from video information serving as media information in the session established with a video server, and the transmitting unit transmits the audio information to a mobile phone included in the plurality of terminal devices.

(Supplementary Note 3) The information processing system according to Supplementary Note 1 or 2, further including, a managing unit manages the profile, wherein the content structuring unit structures the content according to the profile managed by the managing unit.

(Supplementary Note 4) The information processing system according to any one of Supplementary Notes 1 to 3, wherein the content structuring unit individually structures a plurality of contents in order to divide and deliver a content to be delivered to one user to the plurality of terminal devices.

(Supplementary Note 5) The information processing system according to any one of Supplementary Notes 1 to 4, wherein the profile includes each IP address of each terminal device, and the transmitting unit transmits each content to each terminal device using each IP address.

(Supplementary Note 6) The information processing system according to any one of Supplementary Notes 1 to 5, wherein the profile includes position information of each terminal device, and the session control unit selects each terminal device to which each content is to be output based on each position information.

(Supplementary Note 7) The information processing system according to any one of Supplementary Notes 1 to 6, wherein the profile includes at least one of a screen size, an audio output method, a communication rate, and a power source of each terminal device, and the content structuring unit structures each content according to at least one of the screen size, the audio output method, the communication rate, and the power source of each terminal device.

(Supplementary Note 8) The information processing system according to any one of Supplementary Notes 1 to 7, wherein the profile includes a security level of each terminal device, the content structuring unit selects media information according to each security level of each terminal device and structures each content.

(Supplementary Note 9) An information processing method, including: acquiring a plurality of pieces of media information through a session established with at least one server; separating at least one piece of media information from the acquired plurality of pieces of media information based on profiles of a plurality of terminal devices; structuring each of contents to be respectively transmitted to the plurality of terminal devices from the at least one piece of separated media information; and transmitting each structured content to each terminal device.

(Supplementary Note 10) A recording medium readable by at least one computer, the recording medium recording a program causing at least one computer to execute: acquiring a plurality of pieces of media information through a session established with at least one server; separating at least one piece of media information from the acquired plurality of pieces of media information based on profiles of a plurality of terminal devices; structuring each of contents to be respectively transmitted to the plurality of terminal devices from the at least one piece of separated media information; and transmitting each structured content to each terminal device.

(Supplementary Note 11) A program causing at least one computer to execute: acquiring a plurality of pieces of media information through a session established with at least one server; separating at least one piece of media information from the acquired plurality of pieces of media information based on profiles of a plurality of terminal devices; structuring each of contents to be respectively transmitted to the plurality of terminal devices from the at least one piece of separated media information; and transmitting each structured content to each terminal device.

The present disclosure contains subject matter related to that disclosed in Japanese Priority Patent Application JP 2010-135928 filed in the Japan Patent Office on Jun. 15, 2010, the entire content of which is hereby incorporated by reference.

The invention claimed is:

1. An information processing system, comprising:
a session control unit that separates at least one piece of media information from a plurality of pieces of media information acquired through a session established with at least one server based on profiles of a plurality of terminal devices;
a content structuring unit that creates edited data by editing the media information separated by the session control unit on the basis of a profile of a terminal device from among the profiles of the plurality of terminal devices, and structures a content using the edited data created on the basis of the profile of the terminal device;
a transmitting unit that transmits the content structured by the content structuring unit to the terminal device, the profile of which is used to create the edited data that is used to structure the content,
wherein the profile of the terminal device indicates position of the terminal device,
wherein the session control unit traces the position of the terminal device based on the profile of the terminal device, and
wherein the session control unit provides, based on the position of the terminal device, a candidate terminal device for the terminal device to which the structured content is transmitted, the candidate terminal device being provided in a selectable manner from among the plurality of terminal devices.

2. The information processing system according to claim 1, wherein the session control unit separates audio information from video information serving as media information in the session established with a video server, and
the transmitting unit transmits the audio information to a mobile phone included in the plurality of terminal devices.

3. The information processing system according to claim 1, wherein the content structuring unit individually structures a plurality of contents in order to divide and deliver the structured content to be delivered to one user to the plurality of terminal devices.

4. The information processing system according to claim 1, wherein the profile includes each IP address of each terminal device, and
the transmitting unit transmits each structured content to each terminal device using each IP address.

5. The information processing system according to claim 1, wherein the profile includes position information of each terminal device, and
the session control unit selects each terminal device to which each structured content is to be output based on each position information.

6. The information processing system according to claim 1, wherein the profile includes at least one of a screen size, an audio output method, a communication rate, and a power source of each terminal device, and
the content structuring unit structures each content according to at least one of the screen size, the audio output method, the communication rate, and the power source of each terminal device.

7. The information processing system according to claim 1, wherein the profile includes a security level of each terminal device,
the content structuring unit selects media information according to each security level of each terminal device and structures each content.

8. An information processing method, comprising:
acquiring a plurality of pieces of media information through a session established with at least one server;
separating at least one piece of media information from the acquired plurality of pieces of media information based on profiles of a plurality of terminal devices;
creating edited data by editing the media information separated on the basis of a profile of a terminal device from among the profiles of the plurality of terminal devices;
structuring a content using the edited data created on the basis of the profile of the terminal device;
transmitting the structured content to the terminal device, the profile of which is used to create the edited data that is used to structure the content,
wherein the profile of the terminal device indicates a position of the terminal device;
tracing the position of the terminal device based on the profile of the terminal device; and
providing, based on the position of the terminal device, a candidate terminal device for the terminal device to which the structured content is transmitted, the candidate terminal device being provided in a selectable manner from among the plurality of terminal devices.

9. A non-transitory computer readable storage medium readable by at least one computer, the computer readable storage medium recording a program causing the at least one computer to execute:
acquiring a plurality of pieces of media information through a session established with at least one server;
separating at least one piece of media information from the acquired plurality of pieces of media information based on profiles of a plurality of terminal devices;
creating edited data by editing the media information separated on the basis of a profile of a terminal device from among the profiles of the plurality of terminal devices;
structuring a content using the edited data created on the basis of the profile of the terminal device;
transmitting the structured content to the terminal device, the profile of which is used to create the edited data that is used to structure the content,
wherein the profile of the terminal device indicates a position of the terminal device;

tracing the position of the terminal device based on the profile of the terminal device; and providing, based on the position of the terminal device, a candidate terminal device for the terminal device to which the structured content is transmitted, the candidate terminal device being provided in a selectable manner from among the plurality of terminal devices.

10. The information processing system according to claim 2, further comprising, a managing unit manages the profile, wherein the content structuring unit structures a content according to the profile managed by the managing unit.

11. The information processing system according to claim 2, wherein the content structuring unit individually structures a plurality of contents in order to divide and deliver the structured content to be delivered to one user to the plurality of terminal devices.

12. The information processing system according to claim 2, wherein the profile includes each IP address of each terminal device, and the transmitting unit transmits each structured content to each terminal device using each IP address.

13. The information processing system according to claim 3, wherein the profile includes each IP address of each terminal device, and the transmitting unit transmits each structured content to each terminal device using each IP address.

14. The information processing system according to claim 2, wherein the profile includes position information of each terminal device, and the session control unit selects each terminal device to which each structured content is to be output based on each position information.

15. The information processing system according to claim 3, wherein the profile includes position information of each terminal device, and the session control unit selects each terminal device to which each structured content is to be output based on each position information.

16. The information processing system according to claim 4, wherein the profile includes position information of each terminal device, and the session control unit selects each terminal device to which each structured content is to be output based on each position information.

17. The information processing system according to claim 1, wherein the session control unit provides a recommendation of the candidate terminal device for use as the terminal device from among the plurality of terminal devices in the selectable manner according to the position of the terminal device.

18. The information processing system according to claim 1, wherein the session control unit traces the position of the terminal device based on the profile of the terminal device to provide the content, and wherein the session control unit provides an option of the candidate terminal device to be selected as a transmission target of the structured content based on the position of the terminal device.

* * * * *